United States Patent
Weinflash

(10) Patent No.: US 9,727,854 B2
(45) Date of Patent: *Aug. 8, 2017

(54) SYSTEM AND METHOD FOR EXPEDITED RELEASE OF HELD ITEMS

(71) Applicant: Early Warning Services, LLC, Scottsdale, AZ (US)

(72) Inventor: Laura Weinflash, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 948 days.

This patent is subject to a terminal disclaimer.

(21) Appl. No.: 13/734,115

(22) Filed: Jan. 4, 2013

(65) Prior Publication Data

US 2013/0191273 A1    Jul. 25, 2013

Related U.S. Application Data

(63) Continuation of application No. 11/944,191, filed on Nov. 21, 2007, now Pat. No. 8,370,230.

(51) Int. Cl.
| | |
|---|---|
| *G06Q 20/22* | (2012.01) |
| *G06Q 20/04* | (2012.01) |
| *G06Q 40/02* | (2012.01) |
| *G06Q 40/00* | (2012.01) |

(52) U.S. Cl.
CPC .......... *G06Q 20/22* (2013.01); *G06Q 20/042* (2013.01); *G06Q 40/02* (2013.01); *G06Q 40/12* (2013.12)

(58) Field of Classification Search
CPC ...... G06Q 20/042; G06Q 40/02; G06Q 20/22; G06Q 40/12; G06Q 40/06
USPC ......... 705/34, 39, 44, 30, 38, 36 R; 709/206
See application file for complete search history.

(56) References Cited

U.S. PATENT DOCUMENTS

| | | |
|---|---|---|
| 5,412,190 A | 5/1995 | Josephson et al. |
| 5,703,344 A | 12/1997 | Bezy et al. |
| 6,019,282 A | 2/2000 | Thompson et al. |
| 6,647,376 B1 | 11/2003 | Farrar et al. |
| 2004/0148235 A1 | 7/2004 | Craig et al. |
| 2005/0197945 A1 | 9/2005 | Harper |

*Primary Examiner* — Vanel Frenel
(74) *Attorney, Agent, or Firm* — Kilpatrick Townsend & Stockton LLP

(57) ABSTRACT

A system for identifying and expediting the release of held items, such as checks. Paying banks (having accounts against which the checks are drawn) provide paid item files to the system, and depository banks (where checks have been deposited) provide held item files to the system. If there is a match of a paid item file and held item file (indicating that a held check has been paid by the paying bank), the depository bank is notified that the item has been paid and that the hold may be released.

30 Claims, 3 Drawing Sheets

| PAID ITEM FILE | | | | | 132 |
|---|---|---|---|---|---|
| BANK ID | ACCT No. | SERIAL No. | AMOUNT | PAID DATE | |

| HELD ITEM FILE | | | | | | | 142 |
|---|---|---|---|---|---|---|---|
| BANK ID | ACCT No. | SERIAL No. | AMOUNT | DEPOSITORY ID | DEP. DATE | HOLD EXP. DATE | |

PAID ITEM FILE 132

| BANK ID | ACCT No. | SERIAL No. | AMOUNT | PAID DATE |
|---|---|---|---|---|

FIG. 2A

HELD ITEM FILE 142

| BANK ID | ACCT No. | SERIAL No. | AMOUNT | DEPOSITORY ID | DEP. DATE | HOLD EXP. DATE |
|---|---|---|---|---|---|---|

FIG. 2B

PAID CONFIRMATION FILE 152

| BANK ID | ACCT No. | SERIAL No. | DEPOSITORY ID | AMOUNT | PAID (Y/N) |
|---|---|---|---|---|---|

FIG. 2C

SYSTEM AND METHOD FOR EXPEDITED RELEASE OF HELD ITEMS

CROSS-REFERENCES TO RELATED APPLICATIONS

This Application is a continuation of application Ser. No. 11/944,191 filed Nov. 21, 2007, which is hereby incorporated by reference in its entirety for all purposes.

BACKGROUND OF THE INVENTION

It is common for banks and other financial institutions to place holds on checks when presented for deposit by customers, to allow sufficient time for the checks to clear at the paying bank. While such holds are typically for a short, fixed period of time (e.g., a few business days), in some cases a depository bank (the payee's bank) may require a longer hold, such as for a new customer or a customer without good credit. While such banking practices may be prudent to reduce the risk from bad or fraudulent checks, they lead to frustration when customers are not able to use the funds until the hold expires.

Usually, the release of funds for held checks is based on the period of the hold rather that the actual clearing of the check and transfer of funds from the paying bank to the depository bank. In some instances, the check may clear and be paid quickly to the depository bank, but since the hold is for a fixed period of time, the paid funds are not made available to the customer. Typically, the depository bank only knows the actual status of the check if it is returned with an insufficient funds or similar notice from the paying bank. Otherwise, it is assumed to have cleared after a specified period from the time of presentment (to the paying bank). Thus, in some cases where a check has cleared, the depository bank may have the funds from the paid check for several days before funds are attributed to and made available to the customer.

BRIEF SUMMARY OF THE INVENTION

There is provided, in accordance with embodiments of the present invention, a system and method for expediting the release of held checks and similar items.

In one embodiment, the system includes a memory for storing data that represents held items (checks) on which holds have been placed by a receiving entity (e.g., depository bank) and for storing data that identifies paid items which have been paid by a paying entity (e.g., paying bank). The system also includes a management system for comparing held items and paid items, and for identifying any held item that has been paid, so that the receiving entity can be notified of such identified item and release the hold.

A more complete understanding of the present invention may be derived by referring to the detailed description of the invention and to the claims, when considered in connection with the Figures.

BRIEF DESCRIPTION OF THE DRAWINGS

FIGS. 2A, 2B and 2C illustrate the content of paid and held item files sent to the item identifying system of FIG. 1, and the content of a paid confirmation file sent from the identifying system to a depository bank.

DETAILED DESCRIPTION OF THE INVENTION

There are various embodiments and configurations for implementing the present invention. Generally, embodiments provide systems and methods for identifying a held item (e.g., check) that has been paid by a bank or other paying entity, in order to expedite release of the held item.

In one embodiment, a paid item identifying system is provided for receiving files representing held items (checks) from a depository bank (the bank where a payee has presented items for deposit). The identifying system also receives files representing paid items from paying banks (the banks maintaining accounts on which checks have been drawn). The identifying system uses the files to periodically compare each paid item to each held item, and to notify the depository bank if a held item has been paid.

For convenience, the term "item" is used herein to refer not only to checks, but also more broadly to any negotiable instrument, share draft, negotiable order of withdrawal, or other item which may have payment or credit withheld to assure actual payment by a paying bank or similar paying entity.

Figure 1:
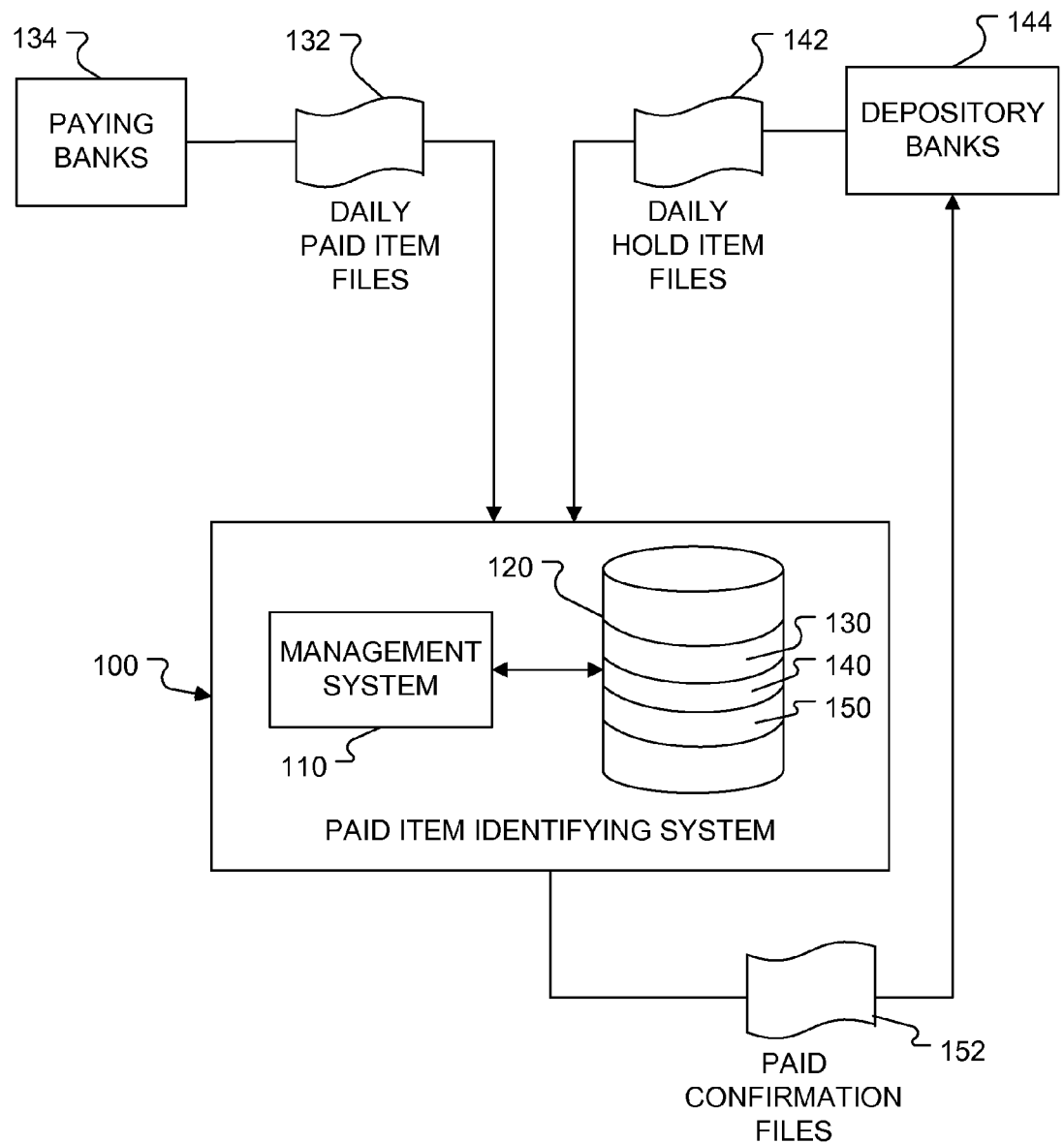
FIG. 1 is a general block diagram showing an item identifying system for identifying paid checks.

Referring now to FIG. 1, there is illustrated a paid item identifying system 100. The system 100 includes a management or processing system 110 and a memory or database 120. As illustrated diagrammatically in FIG. 1, database 120 has a storage area 130 for receiving and storing daily paid item files or records 132 received from paying banks 134 (i.e., banks against which checks have been drawn) and a storage area 140 for receiving and storing daily hold item files or records 142 received from depository banks 144 (i.e., banks receiving checks for deposit, and placing a hold until such checks clear). In the illustrated embodiment, the identifying system 100 is operated by a third party that operates independently of the paying banks or the depository banks, although in some embodiments the operator of the identifying system may be affiliated with one or more of the banks.

As illustrated in FIG. 1, and as will be described in greater detail below, management system 110 generates or builds paid confirmation files or records 152 in response to comparison of the files 132 and 142 that are stored in database 120. A paid confirmation file 152 for a specific check is created only if a paid item (represented by one of paid item files 132 stored within database 120) matches a held item (represented by one of the held item files 142 stored within database 120). The paid confirmation files 152 are stored in storage area 150 of database 120, and are periodically provided to depository banks 144. More specifically, each paid confirmation file corresponding to a check for which one of the depository banks 144 has provided a held item file, is returned to the depository bank which has placed a hold on the check.

Referring now to FIGS. 2A through 2C, there are illustrated data fields within each of the files or records 132, 142 and 152. As seen in FIG. 2A, each paid item file 132 is associated with one check and includes a Bank ID (the eight digit routing number identifying the paying bank), an Account Number for the account on which the check is drawn (typically ten digits), a Serial Number (typically three to five digits representing the check number), the Amount of the check, and a Paid Date (the date the check has been paid, i.e., funds for the check has been transferred by the paying bank to the depository bank). As seen in FIG. 2B, each held item file 142 includes the same information as the paid item file 132 (Bank ID, Account Number, Serial Number, Amount), but also additional fields for a Depository ID (routing number of the depository bank), a Deposit Date (the date the check has been deposited by the payee at the depository bank), and a Hold Expiration Date (the date that the depository bank will automatically release the hold). As seen in FIG. 2C, each paid confirmation file 152 includes a Bank ID, Account Number, Serial Number, Amount, Depository ID, and a Paid marker bit (Y/N) indicating whether the item has in fact been paid. As should be apparent, the Paid marker bit is marked as paid ("Y") and the paid confirmation file sent to the depository bank 144 only if the identified check has in fact been paid by the paying bank (as evidenced by receipt of a paid item file 132 corresponding to the check).

Figure 3:
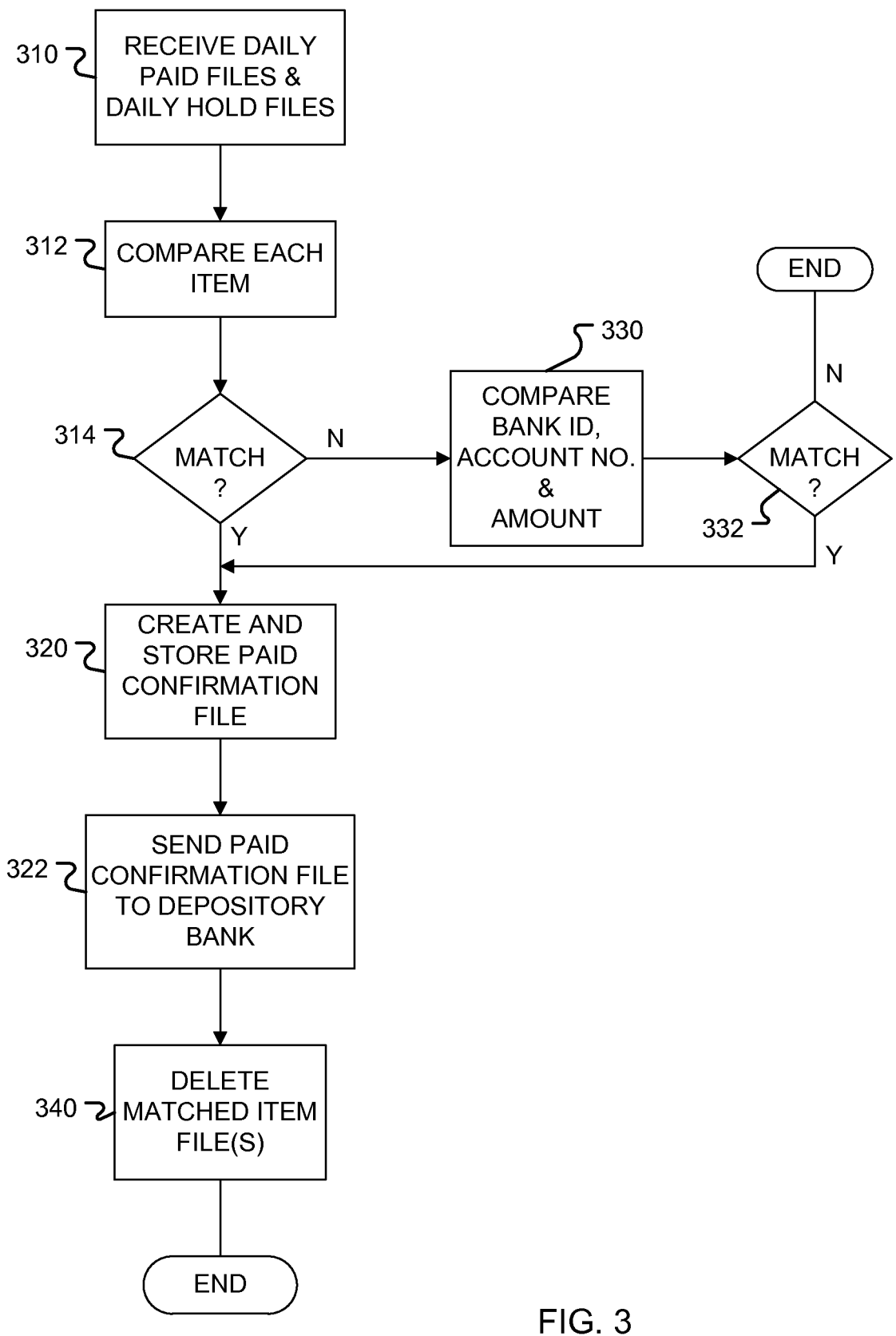
FIG. 3 is a flow diagram illustrating the operation of the item identifying system.

FIG. 3 illustrates a process for identifying and confirming paid items, with programmed steps executed by management system 110 within system 100. As seen, system 100 first receives both daily paid item files from paying banks 134 and daily hold item files from depository banks 144. Such files are stored at database 120 (storage areas 130 and 140). Periodically, at step 312, the management system 110 takes each paid item file 132 (as illustrated in FIG. 2A) and compares it to each held item file 142 (as illustrated in FIG. 2B). In one embodiment, such comparison occurs once daily, but it should be appreciated that the frequency could be based on the specific needs or desires of the parties involved. Alternatively, the comparison could be made on a real time basis, at the time each paid item file is received and stored within system 100. The initial comparison of items at step 312 uses the bank ID, account number, and serial number fields.

If there is match of a paid item file to a held item file (step 314), then a paid confirmation file 152 (FIG. 2C) for the corresponding check is created and stored within database 120 (step 320), and then sent to the depository bank (step 322) that placed the hold on the check. If there is no match at step 314, management system 110 conducts a second comparison of paid item files and held items files for matches of bank ID and account numbers and amounts (step 330). This last mention step looks for items where a serial number is not present in the file. As will be appreciated by those familiar with check processing, depending on the systems and processes involved in processing checks, in some cases the electronic records for processed checks do not capture serial numbers, but a match of an account number and amount would likely identify those items (without serial numbers) that have been paid. While it is highly unlikely that two different held items would have the same account number and amount, and also be paid on the same or on very close dates, the system 100 could alert a person or employee associated with the identifying system 100 that a match has occurred for multiple items, and an inspection (manual or automated) could be initiated to confirm that the paid item and held item are in fact the same. The inspection could include checking for proximity of deposit and paid dates for other held or paid items having the same amount.

If there is a match for account number and amount (step 332), then a paid confirmation file 152 is created and sent to the depository bank (steps 320, 322). If there is no match at step 322, then the process ends (until resumed for newly received paid item files or held item files).

If there has been a match (steps 314 or 332), and a paid confirmation file sent to the depository bank, then that item has its corresponding paid item file 132 and held item file 142 within database 120 deleted or archived (step 340), since they are no longer needed for comparison. As should be appreciated, if there is no match, the held item files continue to be maintained within database 120, for subsequent comparison with later received paid item files. Matched files that are deleted may be archived elsewhere within database 120 or archived at a different storage location.

Typically a paid item file 132 will not need to be kept once that file has been compared to each of the held item files for a match, since paid item files will normally be received several days after a corresponding held item file for the same check. If there is no match, it is unlikely a hold is in place for that paid item. However, the system 100 may be programmed to keep paid item files active for a short period of time and continue to periodically compare them to newly received held item files, in the event a depository bank has been delayed and has not sent held item files immediately after receiving and placing a hold on checks.

A held item file 142 will normally be kept in database 120 for at least several days after received, since depending on the delay in payment, it may be several days before the corresponding paid item file 132 is provided by the paying bank. On the date the hold expires (as reflected in the Hold Expiration Date field 142 (FIG. 2B)), the hold item file can be automatically deleted or archived, since there is no further need for it in identifying held items for release.

After matched files are deleted or archived (step 340), the process ends (until resumed for newly received paid item files or held item files).

While the system 100 is described as one for identifying paid checks to depository banks, it should be appreciated that the present invention could also be employed in other environments. A vendor, merchant, credit card company or other commercial entity to whom payments are made by check may restrict activity on an account until the check clears, and such an entity may experience lost revenue as a result. As one example, a credit card company may establish a credit limit that is not fully available while payments made by a customer are pending, and a system such as that described herein can be used to more quickly restore the credit limit for use by the customer in making further purchases (i.e., even if the check has not been fully processed by the credit card company's own bank). In such a case, the system 100 could be used to provide a paid item confirmation to the credit card company in response to matches of held item files (from the credit card company, representing payment checks received by the credit card company) and paid item files (from paying banks, representing checks that have been paid by those banks).

Further, the data fields within the paid item files 132, held item files 142 and paid confirmation files 152 are illustrative only, and they may contain more, less or different data than that seen. Generally, such fields will depend on the nature of the items being processed and the nature of data needed to properly identify and make comparisons of held items and paid items.

Thus, while a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system to expedite the release of a hold on payment of an item to a customer, wherein the hold is placed on the item by a receiving entity and it is not paid to the customer by the receiving entity until the hold has been released, and wherein the item is to be paid to the receiving entity by a paying entity, the system comprising:
- a memory to store data that represents held items on which holds have been placed by any one of multiple receiving entities, wherein data representing any held item is stored at the memory for at least a period of time until that held item is paid or the hold is released, and for storing data that represents paid items which have been paid by any one of multiple paying entities, wherein data representing any paid item is stored at the memory for at least a period of time until that paid item has been compared to held items; and
- a management system, including a computer processor, to compare the stored data representing held items and the stored data representing paid items, in order to match held items and paid items and thereby identify any held item that has been paid, and generate data representing matched and identified held items that have been paid, so that the receiving entity can be notified of such identified item and release the hold.

2. The system of claim 1, wherein the item is a negotiable instrument.

3. The system of claim 2, wherein the negotiable instrument is a check.

4. The system of claim 1, wherein the paying entity is a paying bank maintaining an account against which the item has been drawn.

5. The system of claim 1, wherein the receiving entity is a depository bank maintaining an account into which the item is being deposited.

6. The system of claim 1, wherein the memory to store data that represents held items and the memory to store data that represents paid items comprise a database system for periodically receiving and storing held item files, each held item file containing data corresponding to a held item, and for periodically receiving and storing paid item files, each paid item file containing data corresponding to a paid item.

7. The system of claim 6, wherein the database further stores a paid confirmation file containing data corresponding to any held item that has been paid by a paying bank maintaining an account against which the item has been drawn, and wherein the management system sends such paid confirmation file to a depository bank maintaining an account into which the item is being deposited and which has put a hold on that item.

8. The system of claim 7, wherein each paid item file, held item file and paid confirmation file comprises fields for at least a bank ID, an account number and a check serial number.

9. The system of claim 8, wherein the paying bank provides a plurality of daily paid item files, each representing an item that has been paid by the paying bank during a single day.

10. The system of claim 9, wherein the depository bank provides a plurality of daily held item files, each representing an item on which a hold has been placed by the paying bank during a single day.

11. The system of claim 8, wherein each paid item file further comprises a field for a paid date, and wherein the bank ID identifies the paying bank.

12. The system of claim 8, wherein each held item file further comprises fields for a deposit date, a hold expiration date, and a depository ID, wherein the bank ID identifies the paying bank, and wherein the depository ID identifies the depository bank.

13. The system of claim 8, wherein each paid confirmation file further comprises fields for a depository ID and a paid marker bit, wherein the depository ID identifies the depository bank and wherein the paid marker bit identifies the item as paid by the paying bank.

14. The system of claim 8 wherein the management system compares the bank ID, account number and serial number of the paid item files and held item files.

15. The system of claim 14, wherein each paid item file and held item file further comprises a field for the amount of the check, and wherein, when the field for the check serial number is not populated with data, the management system compares the amount in the held item files and paid item files to determine whether there is a match.

16. The system of claim 1, wherein, when a held item is identified as having been paid by the management system, any paid item file and held item file corresponding to that item is deleted from the memory and archived.

17. The system of claim 1, wherein the receiving entity is a commercial entity having an account for the customer, and wherein the item is made in payment on such account.

18. The system of claim 17, wherein the commercial entity is a credit card company.

19. A method to expedite the release of a hold on crediting of a payment item to an account of a customer, wherein the hold is placed on the item by a receiving entity that receives the item from the customer in order to assure payment to the receiving entity by a paying entity, the method comprising:
- receiving held item files from multiple receiving entities, wherein each held item file represents an item on which a hold has been placed by a receiving entity;
- receiving paid item files from multiple paying entities, wherein each paid item file represents an item which has been paid by a paying entity;
- storing in a memory the held item files and the paid item files;
- comparing, by a computer processor at a management system, the held item files to the paid item files; and
- notifying a receiving entity from the management system when a held item file received from that entity has been matched to a paid item file.

20. The method of claim 19, wherein the payment item is a check.

21. The method of claim 20, wherein the paying entity is a paying bank maintaining an account against which the check has been drawn.

22. The method of claim 20, wherein receiving entity is a depository bank maintaining an account into which the check is being deposited.

23. The method of claim 20, wherein the receiving entity is a commercial entity having an account for the customer, and wherein the item is made in payment on such account.

24. A method for expediting the release of a hold on an item presented by a customer for credit to an account maintained by a receiving entity for the customer, wherein the hold has been placed by the receiving entity and wherein the item is to be paid to the receiving entity by a paying entity, the method comprising:
- receiving, at an identifying system, that is operated by a third party, held item files from multiple receiving entities representing items on which holds have been placed by those receiving entities;
- receiving, at the identifying system, paid item files from multiple paying entities representing items which have been paid by the those paying entities;
- storing in a memory at the identifying system the held item files and the paid item files;

comparing, by a computer processor at a management system in the identifying system, the received held item files to the received paid item files, in order to determine when any item represented by a held item file has been paid; and notifying a receiving entity from the management system when a held item from that receiving entity has been paid, so that the hold on such item may be released.

25. The method of claim 24, wherein the third party operates independently of at least one of the multiple receiving entities and multiple paying entities.

26. A system to expedite the release of a hold on payment of an item presented for credit by a customer to a receiving entity, wherein the hold is placed on the item by the receiving entity, and wherein the item is to be paid to the receiving entity by a paying entity, and wherein the item is a negotiable instrument drawn against the paying entity and not credited to the customer, even after cleared at the paying entity, until such hold has been released by the receiving party or has expired, the system comprising:

a database system for periodically receiving and storing held item files, paid item files, and paid confirmation files, each held item file containing data received from a receiving entity corresponding to a held item on which a hold has been placed by the receiving entity, each paid item file containing data corresponding to a paid item which has been paid by a paying entity, and each paid confirmation file containing data corresponding to a held item that has been paid and thereby identifying such paid item; and a management system, including a computer processor, for comparing the stored held item files and the stored paid item files in order to create the paid confirmation files identifying the held items that have been paid, for providing the paid confirmation files to the database system, and for periodically sending, from the database system to a receiving entity, paid confirmation files having items corresponding to any items that have had a hold placed on them by that receiving entity and that have been paid, so that the receiving entity can be notified of such identified items and release the hold.

27. The system of claim 26, wherein the paying entity is a paying bank maintaining an account against which the negotiable instrument has been drawn, and wherein the receiving entity is a depository bank maintaining an account into which the negotiable instrument is being deposited for credit by the customer.

28. The system of claim 27, wherein the negotiable instrument is a check.

29. The system of claim 26, wherein the receiving entity is a commercial entity having an account for the customer, and wherein the item is made in payment on such account.

30. The system of claim 29, wherein the commercial entity is a credit card company.

* * * * *